United States Patent
Takeda et al.

(10) Patent No.: US 9,229,117 B2
(45) Date of Patent: Jan. 5, 2016

(54) RADIATION IMAGING APPARATUS AND RADIATION IMAGING SYSTEM

(71) Applicant: CANON KABUSHIKI KAISHA, Tokyo (JP)

(72) Inventors: Shinichi Takeda, Honjo (JP); Masato Inoue, Kumagaya (JP); Satoru Sawada, Fujioka (JP); Takamasa Ishii, Honjo (JP); Taiki Takei, Okegawa (JP); Kota Nishibe, Honjo (JP); Shoshiro Saruta, Kodama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 221 days.

(21) Appl. No.: 13/963,394

(22) Filed: Aug. 9, 2013

(65) Prior Publication Data

US 2014/0054467 A1 Feb. 27, 2014

(30) Foreign Application Priority Data

Aug. 22, 2012 (JP) ................................. 2012-183592

(51) Int. Cl.
    *G01T 1/20* (2006.01)
(52) U.S. Cl.
    CPC .............. *G01T 1/2006* (2013.01); *G01T 1/2018* (2013.01)
(58) Field of Classification Search
    CPC ........................... G01T 1/2006; G01T 1/2018
    See application file for complete search history.

(56) References Cited

U.S. PATENT DOCUMENTS

| 5,548,122 A | * | 8/1996 | Shoji ........................ 250/370.09 |
| 2010/0019162 A1 | * | 1/2010 | Yamagishi et al. ...... 250/370.11 |
| 2012/0193544 A1 | * | 8/2012 | Kaneko et al. ................ 250/369 |
| 2012/0205543 A1 | * | 8/2012 | Nakatsugawa et al. ....... 250/366 |

FOREIGN PATENT DOCUMENTS

| EP | 88820 B | * | 2/1987 |
| JP | 2002-048872 A | | 2/2002 |
| JP | 2006266936 A | * | 10/2006 |

OTHER PUBLICATIONS

English Translation of Nitta et al.—JP 2006-266936 A published Oct. 5, 2006, translation obtained from AIPN online translation from Japanese Patent Office on May 11, 2015 at https://dossier1.j-platpat.inpit.go.jp/tri/all/odse/ODSE_GM101_Top.action.*

* cited by examiner

*Primary Examiner* — David Porta
*Assistant Examiner* — Jeremy S Valentiner
(74) *Attorney, Agent, or Firm* — Carter, DeLuca, Farrell & Schmidt, LLP

(57) ABSTRACT

A radiation imaging apparatus comprising a plurality of sensor units each including a plurality of photoelectric converters, a substrate configured to support the plurality of sensor units, and a scintillator, wherein the scintillator comprises scintillator grains configured to convert radiation into light and a binder configured to make the scintillator grains adhere to each other, and the scintillator includes first portions provided between the plurality of sensor units and a second portion provided on the plurality of sensor units and the substrate.

7 Claims, 3 Drawing Sheets

RADIATION IMAGING APPARATUS AND RADIATION IMAGING SYSTEM

BACKGROUND OF THE INVENTION

1. Field of the Invention

The present invention relates to a radiation imaging apparatus and a radiation imaging system.

2. Description of the Related Art

As one of radiation imaging apparatuses for large-sized screens, there is available an apparatus having a structure including a plurality of sensor units, each having a sensor array, with a scintillator being formed on them. Stress due to heat and the like is produced at boundary portions between the respective sensor units. This makes the scintillator to tend to separate.

Japanese Patent Laid-Open No. 2002-048872 discloses a structure having a scintillator formed on a transparent film formed on the entire surface of a plurality of sensor units. The structure described in Japanese Patent Laid-Open No. 2002-048872 allows easy formation of a scintillator and prevents the separation of the scintillator.

With an increase in the size of a radiation imaging apparatus, the fabrication yield concerning the separation of a scintillator and the like tends to decrease. Demands have therefore arisen for a technique of further improving the reliability of a radiation imaging apparatus.

SUMMARY OF THE INVENTION

The present invention provides a technique advantageous in improving the reliability of a radiation imaging apparatus.

One of the aspects of the present invention provides a radiation imaging apparatus comprising a plurality of sensor units each including a plurality of photoelectric converters, a substrate configured to support the plurality of sensor units, and a scintillator, wherein the scintillator comprises scintillator grains configured to convert radiation into light and a binder configured to make the scintillator grains adhere to each other, and the scintillator includes first portions provided between the plurality of sensor units and a second portion provided on the plurality of sensor units and the substrate.

Further features of the present invention will become apparent from the following description of exemplary embodiments with reference to the attached drawings.

DESCRIPTION OF THE EMBODIMENTS

Figure 1:
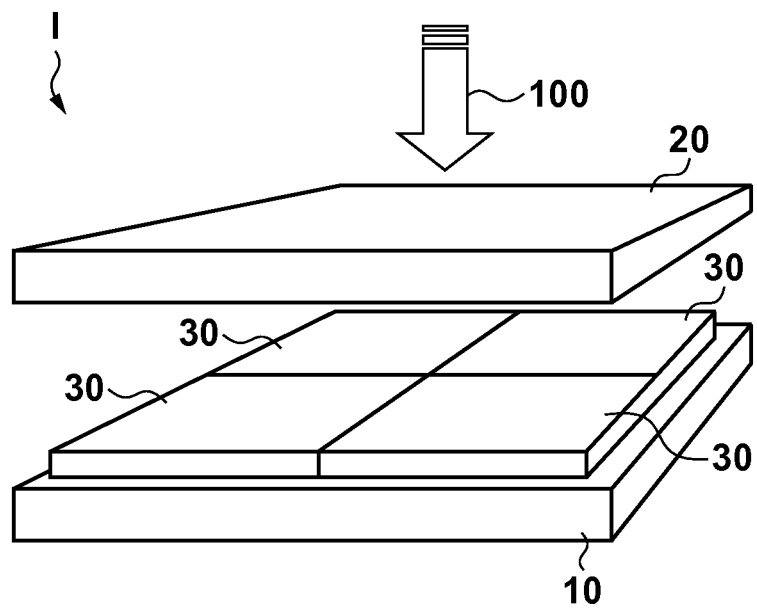
FIG. 1 is a perspective view for explaining an example of the arrangement of a radiation imaging apparatus.

A radiation imaging apparatus I according to an embodiment will be described with reference to FIGS. 1 and 2. FIG. 1 schematically shows the arrangement of the radiation imaging apparatus I. The radiation imaging apparatus I includes a plurality of sensor units 30 each including a plurality of photoelectric converters (not shown), a substrate 10 for supporting the sensor units 30, and a scintillator 20. The scintillator 20 is provided on the substrate 10 on which the sensor units 30 are arrayed.

Radiation 100 which has entered the scintillator 20 comprises information about the inside of the body of a subject (not shown) to be examined. The scintillator 20 converts the radiation 100 into light. The converted light then enters the sensor units 30. The plurality of photoelectric converters included in the sensor units 30 are, for example, arrayed two-dimensionally. It is possible to use, as each photoelectric converter, a PIN sensor or MIS sensor formed from amorphous silicon or a CMOS sensor formed on a silicon substrate. Each sensor unit 30 performs photoelectric conversion to generate an electrical signal corresponding to the amount of incident light. A signal processing unit (not shown) reads out this electrical signal via an I/O interface and processes the signal. In this manner, for example, a radiation image of the inside of the body of the subject is generated. In addition, repeating the above series of operations can acquire, for example, a moving image.

Figure 2:
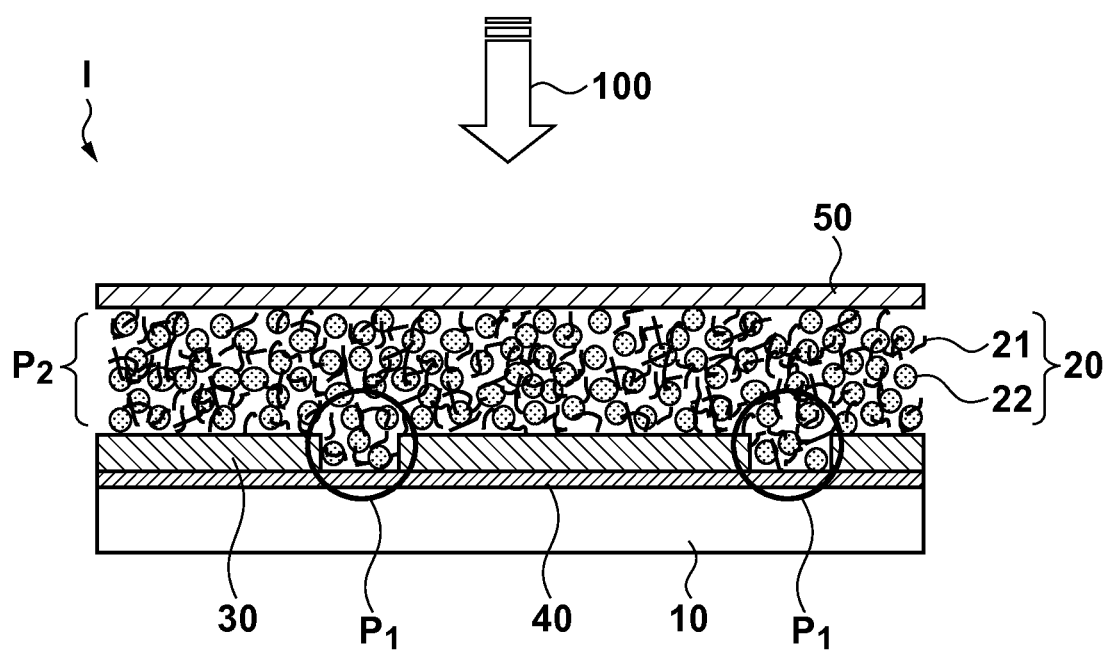
FIG. 2 is a sectional view for explaining an example of a sectional structure of the first embodiment.

FIG. 2 schematically shows a sectional structure of the radiation imaging apparatus I. The plurality of sensor units 30 can be two-dimensionally arrayed on an adhesive layer 40 on the substrate 10 made of glass. A reflecting layer 50 for reflecting light generated in the scintillator 20 toward the scintillator 20 is arranged on the scintillator 20. The reflecting layer 50 can be formed from, for example, an aluminum or white resin sheet and arranged on a pressure sensitive adhesive or an adhesive on the scintillator 20.

The scintillator 20 is applied in the form of a liquid onto the substrate 10 on which the sensor units 30 are arrayed, and is then cured by heat. The scintillator 20 includes scintillator grains 21 which convert radiation into light and a binder 22 which binds the scintillator grains 21 to each other. As the scintillator grains 21, for example, a powder of $Gd_2O_2S$:Tb having a grain diameter of several ten μm. The binder 22 is made of a material having a transparency property and adherence property. The binder 22 comprises an organic resin (ethyl cellulose, PVC, or the like) dispersed and mixed in the scintillator grains 21 to bind the scintillator grains 21 to each other. This maintains the scintillator 20 in a sheet state. The binder 22 contacts the sensor units 30 to fix the scintillator 20 to the plurality of sensor units 30. It is possible to use a solvent having a high boiling point such as terpineol or butyl carbitol acetate so as to make the binder 22 have desired viscosity until the application of the scintillator 20. Since this solvent can dissolve the resin, an adhesive member which is not dissolved in the solvent, for example, an inorganic material such as silica or alumina sol may be used for the adhesive layer 40 described above.

In this case, the plurality of sensor units 30 are arrayed on the adhesive layer 40 which is, for example, adhered or applied on the upper surface of the substrate 10. The arrayed sensor units 30 form an image sensing region. When arraying the sensor units 30, it is possible to provide a gap of several ten to several hundred μm between them to avoid damage and the like due to contact between them. The scintillator 20 can be formed so as to cover this image sensing region by coating and curing using a screen printing method and a coater. The scintillator 20 is also provided in the gaps between the sensor units 30. That is, the scintillator 20 includes first portions $P_1$ (portions provided between the respective adjacent sensor units 30) and a second portion $P_2$ (a portion provided on the plurality of sensor units 30 and the substrate 10). According to this structure, the binder 22 firmly fixes the scintillator 20 to the sensor units 30 at the upper and side surfaces of the sensor units 30. This improves the stress resistance of the radiation imaging apparatus I against heat and the like.

As described above, according to this embodiment, the scintillator 20 and the sensor units 30 are firmly fixed to each other at the upper and side surfaces of the sensor units 30. This improves the stress resistance and reliability of the radiation imaging apparatus I. Alternatively, it is possible to bring the scintillator 20 into direct contact with each sensor unit 30 on the upper surface of the sensor unit 30 and reduce the scattering of light on the contact surface. It is possible to expect an improvement in the quality of a radiation image.

Figure 3:
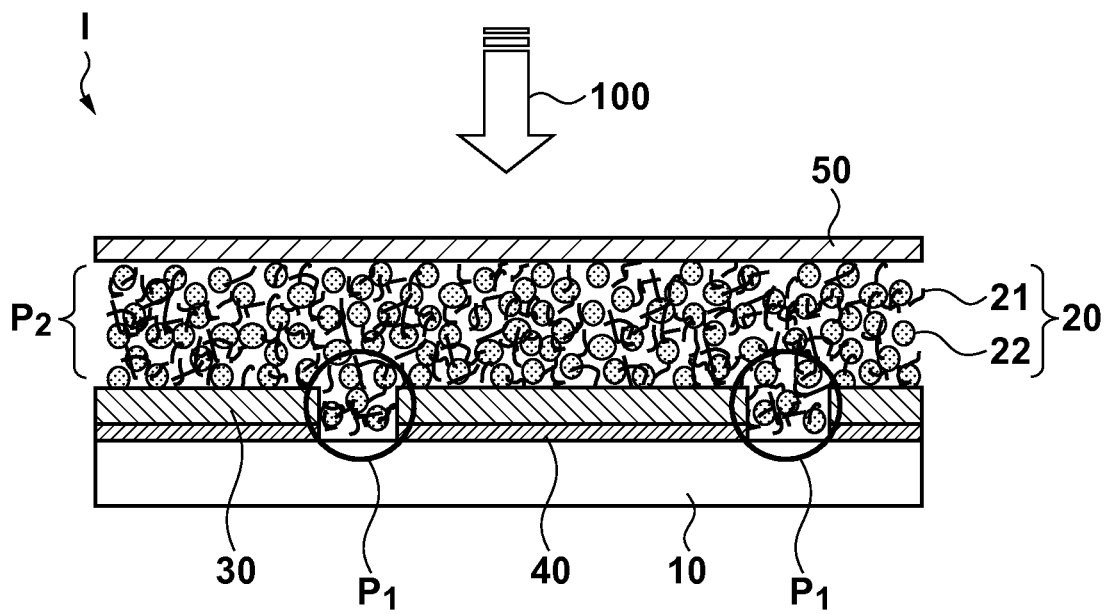
FIG. 3 is a sectional view for explaining an example of a sectional structure of another embodiment.

As shown in FIG. 3, the radiation imaging apparatus I may be configured such that the adhesive layer 40 makes each sensor unit 30 adhere to the substrate 10, and the scintillator 20 contacts the substrate 10 at the first portions $P_1$. This fixes the scintillator 20 to the contact surface of the substrate 10 in addition to the upper and side surfaces of the sensor units 30 with the binder 22. The substrate 10 can disperse and alleviate the stress produced in the radiation imaging apparatus I.

Figure 4:
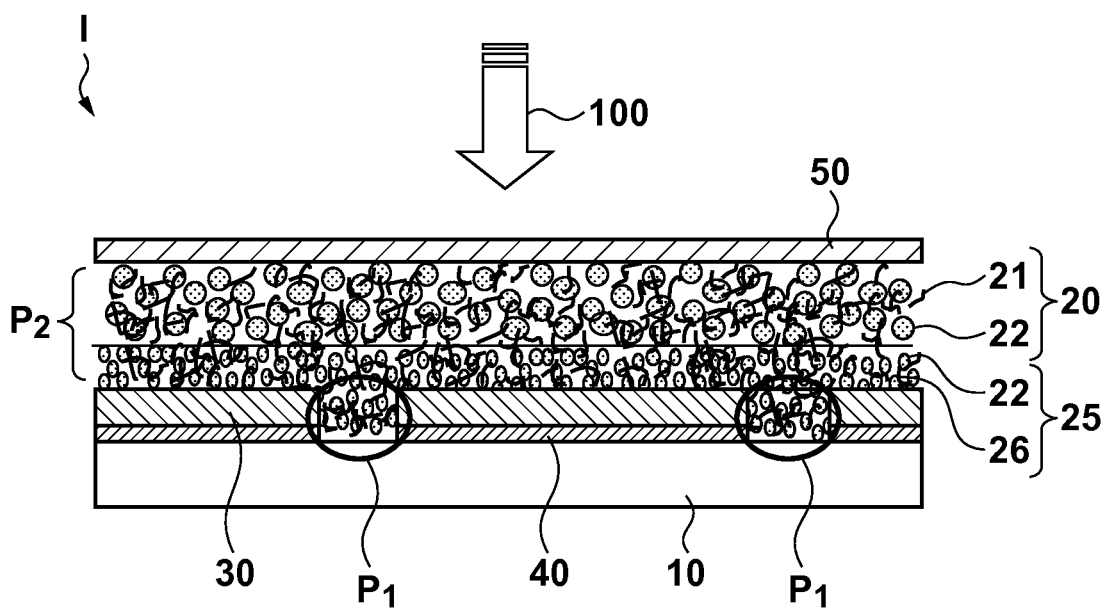
FIG. 4 is a sectional view for explaining an example of a sectional structure of still another embodiment.

In addition, the scintillator 20 may not be a single layer and may be formed from a plurality of layers, as exemplarily shown in FIG. 4. In this case, scintillator grains 26 of the scintillator 25 in the first portions $P_1$ may be smaller in diameter than the scintillator grains 21 of the scintillator 20 in at least part of the second portion $P_2$. If, for example, the scintillator grains 21 have a grain diameter of about several ten μm, the scintillator grains 26 may have a grain diameter of about several ten μm. This can effectively improve the adherence property between the scintillator 20, each sensor unit 30, and the substrate 10.

Although the embodiments have been described above, the present invention is not limited to them. The objects, states, applications, functions, and other specifications of the present invention can be changed as needed, and other embodiments can implement the present invention.

Example of Application to Radiation Imaging System

Figure 5:
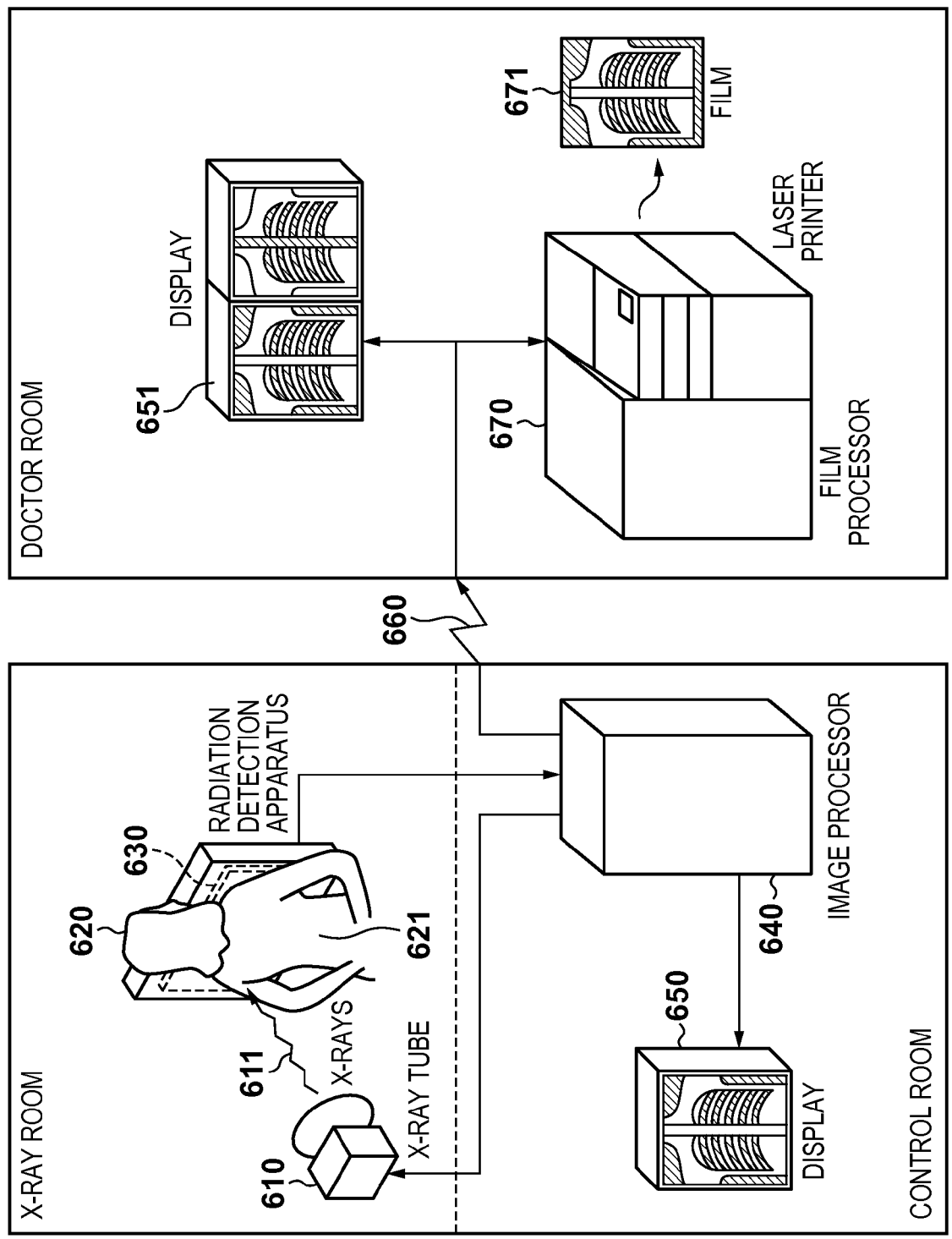
FIG. 5 is a view for explaining an example of the arrangement of an imaging system.

As exemplarily shown in FIG. 5, the above embodiment can be applied to an imaging system. The radiation includes electromagnetic waves such as X-rays, α-rays, β-rays, and γ-rays. The following will exemplify the use of X-rays as a typical example. X-rays 611 generated by an X-ray tube 610 (radiation source) are transmitted through a chest region 621 of a subject 620 such as a patient and enter a radiation detection apparatus 630. The incident X-rays comprise information about the inside of the body of the patient 620. The scintillator emits light as X-rays enter, and electrical information is obtained by photoelectric conversion. This information is converted into a digital signal. An image processor 640 (signal processing unit) performs image processing of the signal. It is possible to observe the resultant image on a display 650 (display unit) in a control room.

In addition, it is possible to transfer this information to a remote place via a telephone line 660 (transmission processing unit). The transferred information can be displayed on, for example, a display 651 (display unit) installed in another place, for example, a doctor room. Furthermore, it is possible to store this information in a recording unit such as an optical disk. In this manner, another doctor in a remote place can diagnose the subject. For example, a film processor 670 (recording unit) can record the information on a film 671 (recording medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-183592, filed Aug. 22, 2012, which is hereby incorporated by reference herein in its entirety.

What is claimed is:

1. A radiation imaging apparatus comprising:
    a substrate;
    a plurality of sensor units, arrayed on the substrate, each including a plurality of photoelectric converters; and
    a scintillator provided both on the plurality of sensor units and in a gap formed between two neighboring sensor units among the plurality of sensor units,
    wherein the scintillator comprises scintillator grains configured to convert radiation into light and a resin configured to make the scintillator grains adhere to each other, and
    the scintillator is fixed, by the resin, to both top faces of the plurality of sensor units and side faces of the two neighboring sensor units forming the gap.

2. The apparatus according to claim 1, further comprising a member having an adherence property which is provided between each of the plurality of sensor units and the substrate,
    wherein the member makes each of the plurality of sensor units adhere to the substrate, and
    the scintillator is also fixed to a top face of the substrate under the gap formed between the two neighboring sensor units.

3. The apparatus according to claim 1, further comprising a reflecting layer arranged on the scintillator and configured to reflect light generated in the scintillator toward the scintillator.

4. A radiation imaging system comprising:
    a radiation imaging apparatus; and
    a radiation source configured to generate radiation, wherein
    the radiation imaging apparatus comprises:
        a substrate;
        a plurality of sensor units, arrayed on the substrate, each including a plurality of photoelectric converters; and
        a scintillator provided both on the plurality of sensor units and in a gap formed between two neighboring sensor units among the plurality of sensor units,
    the scintillator comprises scintillator grains configured to convert radiation into light and a resin configured to make the scintillator grains adhere to each other, and
    the scintillator is fixed, by the resin, to both top faces of the plurality of sensor units and side faces of the two neighboring sensor units forming the gap.

5. The apparatus according to claim 1, wherein
    the scintillator includes a first part provided both on the top faces of the plurality of sensor units and in the gap formed between the two neighboring sensor units so as to cover each of the plurality of sensor units, and a second part provided on the first part, and
    the first part is smaller in the diameter of the scintillator grain than the second part.

6. The apparatus according to claim 1, wherein, in the scintillator, the scintillator grains cover the plurality of sensor units so as to fill the gap formed between the two neighboring sensor units, while being adhered by the resin.

7. The apparatus according to claim 6, wherein each scintillator grain filling the gap is smaller in the diameter than scintillator grains located on the plurality of sensor units.

* * * * *